United States Patent [19]

Rye et al.

[11] 4,134,726
[45] Jan. 16, 1979

[54] TEXTILE FABRIC AND METHOD OF PREPARATION

[75] Inventors: Grover W. Rye, Cuyahoga Falls; Anthony J. Scarpitti; Theodore M. Kersker, both of Akron, all of Ohio

[73] Assignee: The Goodyear Tire & Rubber Company, Akron, Ohio

[21] Appl. No.: 785,397

[22] Filed: Apr. 7, 1977

Related U.S. Application Data

[60] Division of Ser. No. 646,219, Jan. 2, 1976, which is a continuation of Ser. No. 526,082, Nov. 22, 1974, abandoned, which is a continuation of Ser. No. 266,857, Jun. 28, 1972, abandoned.

[51] Int. Cl.$^2$ ............................................. D06L 1/10
[52] U.S. Cl. .......................................... 8/139.1; 8/142
[58] Field of Search .................................. 8/139.1, 142

[56] References Cited

U.S. PATENT DOCUMENTS

| | | | |
|---|---|---|---|
| 2,001,656 | 4/1935 | Gruber-Rehenburg et al. | 8/142 |
| 2,312,910 | 3/1943 | Jennings | 8/142 |
| 2,573,966 | 11/1951 | Hamlin | 8/142 |
| 2,736,632 | 2/1956 | Blau | 8/142 |
| 2,831,332 | 4/1958 | Ross | 8/142 |
| 3,106,460 | 10/1963 | Topham | 8/142 |
| 3,542,506 | 11/1970 | Case et al. | 8/142 |
| 3,667,898 | 6/1972 | Bergmaun et al. | 8/94 |
| 3,762,862 | 10/1973 | Cunningham | 8/142 |

FOREIGN PATENT DOCUMENTS

966739  4/1975  Canada ........................................ 8/142

OTHER PUBLICATIONS

White, Amer. Dyestuff Rep., Jul. 31, 1967, pp. 18–24.

*Primary Examiner*—Donald Levy
*Attorney, Agent, or Firm*—H. C. Young, Jr.

[57] ABSTRACT

Method and apparatus for treating a textile fabric with a volatile organic solvent and the resulting treated fabric which comprises, in cooperative sequence, pretreating said fabric in a pretreat stage by sequentially preheating to remove volatile materials and then cooling, followed by applying said solvent to the fabric in an application stage and then drying the fabric by evaporation and condensing and recovering the evaporated solvent in a drying and recovery stage, followed by recycling the recovered solvent back to said application stage. The invention has particular utility by providing a method which enables the recycling of the organic solvent from a fabric treating process and, therefore, provides an improved treated fabric.

6 Claims, 1 Drawing Figure

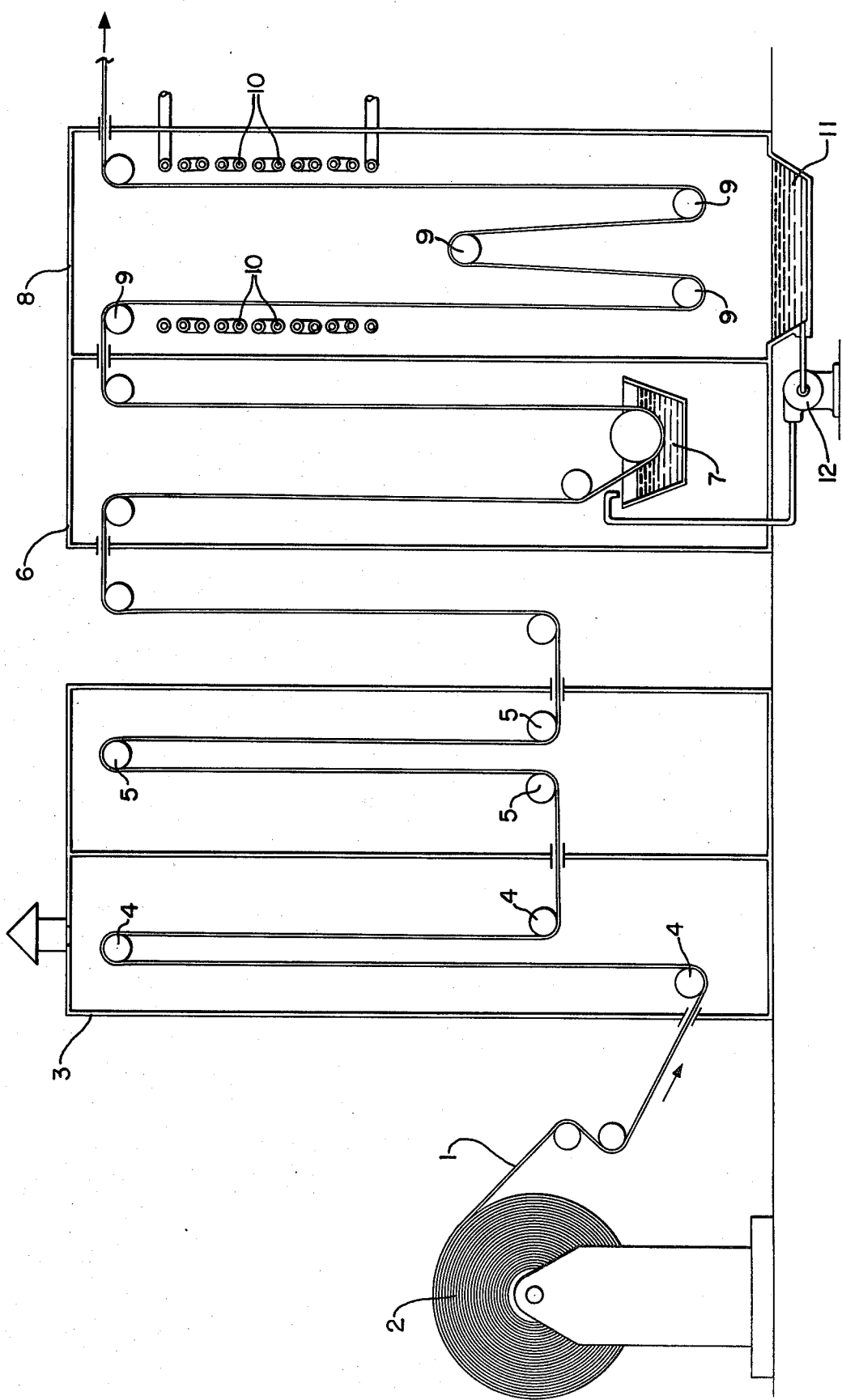

TEXTILE FABRIC AND METHOD OF PREPARATION

This is a division, of application Ser. No. 646,219 filed Jan. 2, 1976, now, which in turn was a continuation of application Ser. No. 526,082, filed Nov. 22, 1974, now abandoned, which in turn was a continuation of application Ser. No. 266,857, filed June 28, 1972, now abandoned.

This invention relates to a method and apparatus for treating a textile fabric and the resulting treated fabric. The invention particularly relates to providing a vehicular pneumatic tire cord fabric by treating with a volatile organic solvent and recycling said solvent. It further relates to such treatment with the solvent as a vehicle for depositing fabric reactive materials on the fabric.

Heretofore, various methods have been utilized for pretreating textile fabrics with volatile organic solvents in enclosed systems before further treating with other materials such as dyes and coatings. Exemplary of such methods is U.S. Pat. No. 2,312,910, teaching the treatment of fabric with a volatile organic solvent such as a chlorinated hydrocarbon followed by heating the fabric in a chamber to evaporate the solvent and recovering evaporated solvent by condensation on a continuous basis.

It has been particularly desirable to treat vehicular pneumatic tire cord fabrics with volatile organic solvents instead of conventional aqueous solutions and emulsions. An especial benefit is to provide improved cord to rubber adhesion by using the organic solvent as a vehicle for depositing reactive materials on the fabric, thus, also providing a greater flexibility in choice of coating materials, many of which are reactive with water, and further providing greater ability to wet the various cord surfaces.

Heretofore, however, such volatile organic solvent treatments have not been entirely commercially successful, especially for tire cord fabric, not only because of inherent toxicity and fire hazard but particularly because of the high cost of solvent recovery systems which must be very efficient. Relatively high purity solvents are typically required. Recovery and recycle of the volatile solvent is economically mandatory because of its relatively high replacement cost. Yet recycling has typically been prohibitive primarily because of formation and build-up of water emulsion and other substances in the recovered solvent. The other substances apparently tend to promote water emulsions. An excessive treatment time for the recovered solvent is necessary to break the water emulsion before the solvent can be recycled. The other substances further tend to contaminate the treated fabric, particularly when the solvent contains reactive materials and because of their often times tacky nature, tend to stick to the equipment causing an early shut down. Thus, the recycled solvent has been prohibitive for a number of commercial applications from both the product quality standpoint and from the process equipment standpoint.

It is, therefore, an object of this invention to provide an improved continuous method and apparatus for treating a textile fabric, particularly a tire cord fabric, with a volatile organic solvent, removing the solvent from the fabric and recycling the solvent. It is a further object to provide an improved fabric product.

It has now been discovered that the contamination of the recycle solvent is substantially caused by the volatile portion of the finishing materials, including substances such as lubricants and emulsifiers, typically applied to the textile fibers during their manufacture as well as residual moisture inherently and normally contained in the manufactured cord or fabric. Such materials are apparently removed from the fabric by treatment with a volatile organic solvent simultaneously upon drying the treated fabric and they subsequently contaminate the recovered solvent. This, in turn, prohibits economical recycling.

In accordance with this invention, it has been discovered that a method of continuous volatile organic solvent treatment of a textile fabric comprises, in cooperative sequence, pretreating said fabric in a pretreat stage by sequentially preheating the fabric to a temperature in the range of about 70° C. to about 200° C. to remove volatile materials therefrom and then cooling said fabric to a temperature at least about 5° C. below the boiling point of said volatile organic solvent, applying to the pretreated fabric a solution comprising said volatile organic solvent in an application stage, drying the fabric by evaporation at an elevated temperature and condensing and recovering the evaporated solvent in a drying and recovery stage followed by recycling the recovered solvent back to said application stage.

In further accordance with this invention, an improved treated fabric product is provided, particularly for use as tire cord embedded in rubber which exhibits substantially improved peel adhesion, fatigue resistance and reduced stiffness. It should be appreciated that, by operation of the invention, the actual treated fabric product of the invention evolves after a reasonably adequate time for the required sequential pretreat/application/drying/recovery and solvent recycle steps to substantially equilibrate, such as from about 1 to 2 hours.

Thus, the invention particularly provides an improved apparatus for treating textile fabrics, particularly tire cord fabrics which comprises, in cooperative sequence, pretreating means for pretreating the fabric comprising its sequential heating step with venting of volatile fabric finishing materials and moisture, and cooling step, the application means for application of the volatile organic solvent to the fabric, the drying and recovery means for evaporation of solvent from the fabric and its recovery by condensation, followed by a recycle means for recycling said recovered solvent back to said application means.

It is especially preferred that both the application stage and the drying and recovery stage are enclosed and isolated from the atmosphere. It is further preferred that the application stage is separated from the drying and recovery stage with said drying and recovery stage enclosed as a unit. The isolation is typically accomplished by application of vapor locks or seals around the entrance or exit openings for the moving textile fabric. These openings, in turn, are typically positioned in the upper portions of the application stage and the drying and recovery stage to take advantage of the solvent vapors being heavier than air. The vapor seals are simply accomplished by positioning a cooling means, such as cooling coils, near or around the entrances and exits to condense the heavy vapors, thus preventing their escape.

The volatile organic solvent must wet the fabric and can be applied to the fabric by various means in the application stage, such as dipping, spraying and coating. Application by continuous dipping is preferred with the application stage, therefore, referred to as a dip stage.

The various textile fabrics can be treated by the method and apparatus of this invention. Representative of such textile fabrics are woven and non-woven textile fabrics prepared from various yarns and continuous filaments by processes known to those skilled in the art. Woven tire cord fabrics are preferred because of their unique problems and requirements of future adherence to rubber under tensioned and flexing conditions. Various materials can be used for the fabrics, representative of which are linear polyamides, such as the various nylons including nylon 6 and nylon 66, aromatic nylons such as p-aminobenzoic acid polymer (p-abap) as described in French Pat. No. 1,526,745, linear polyesters such as polyethylene terephthalate and cellulose and cellulose derivatives such as cotton and rayon. Wire and glass woven fabrics can also be treated.

In the practice of this invention, the fabric is preferred to be pretreated on a continuous basis in the pretreat stage by first heating to a temperature of about 70° C. to about 200° C., preferably about 90° C. to about 150° C., over a period of about 5 to 120 seconds, preferably about 10 to about 60 seconds. Various methods can be used to heat the fabric such as by radiant, hot air and direct contact heating. Thus, a suitable environment for heating the fabric may have a temperature range from about 100° C. to 250° C., depending upon whether a direct contact, hot gas or radiant means is relied on. For example, the heating can easily be facilitated by passing the fabric over rotating hot cans which are internally heated with superheated steam. Evaporated volatiles, including moisture and finishing materials, can be removed from the pretreat stage by venting to the atmosphere or to a collecting means such as a condenser. It should be appreciated that typically a portion rather than a whole of the finishing materials and moisture is evaporatively removed by this invention and this has been discovered to be sufficient to effect a comparatively economical operation.

The fabric is further and sequentially pretreated in the pretreat stage by continuous cooling to a temperature of about 25° C. to about 55° C., preferably at least 5° C. and more preferably at least about 10° C., below the boiling point of the volatile organic solvent to be subsequently used in the application or dip stage, over a period of about 5 to about 120 seconds, preferably about 10 to about 60 seconds.

Immediately the cooled fabric is fed to the application or dip stage where it is continuously contacted with a volatile organic solvent, preferably by dipping, for about 0.1 to about 1 second and preferably about 0.1 to about 0.4 second at a temperature of about 25° C. to about 75° C., at least about 5° C. and preferably at least about 20° C., below the boiling point of the said solvent.

The dipped fabric is then fed to the upper portion of an enclosed drying and recovery stage where it is heated to a temperature of about 80° C. to about 150° C., preferably at or up to about 10° C., above the boiling point of said volatile organic solvent, over a period of about 6 to about 120 seconds, preferably about 10 to about 60 seconds, and sufficient to evaporate at least about 95 percent, preferably at least about 97 percent and more preferably at least about 99.8 percent by weight of said solvent from the fabric. The fabric can be heated by various methods such as by direct contact, hot gas or vapor and by radiant heat. In this stage the solvent is recovered by condensation, such as by exposure to cooling coils, and then recycled back to the dip stage. Additional treating materials, such as polyisocyanates, can be added to the recycled solvent and, if desired, the recycled solvent can be further treated before adding to the dip stage to remove small amounts of residual fines and moisture.

During the pretreatment, solvent application and drying steps, sufficient tension is typically placed on the fabric to prevent shrinkage. Such tension can range from about 0.2 to about 7 pounds per cord. A typical range may be from about 1 to about 2.5 pounds per cord.

It should be appreciated during the various operations of this invention that the actual temperature of the fabric is typically continually increasing or decreasing within a particular heating or cooling step and that the indicated required temperature is measured at the appropriate entrance or exit of a particular stage and is typically a respective maximum or minimum for that stage. For the purposes of this invention, the fabric temperature can conveniently be measured by direct fabric surface contact with a copper disc of about 20 gauge thickness having embedded therein an iron-constant thermocouple (J-type). The temperature is read directly in degrees Fahrenheit from a potentiometer pyrometer connected to the thermocouple, obtainable as Model 80200 from the Thermo Electric Company, Inc of Saddle Brook, N.J.

Various organic solvents can be used for the application or dip stage, representative of which are chlorosubstituted hyrocarbons selected from unsaturated hyrdocarbons such as dichloroethylene, trichloroethylene, 1,1,2,2-tetrachloroethylene; and from chloro-substituted saturated hydrocarbons such as dichloromethane, 1,2-dichloroethane, trichloroethane, including 1,1,1-trichloroethane or methyl chloroform, and 1,1,2,2-tetrachloroethane, with methyl chloroform being perferred; from liquid ketones containing from 3 to 7 carbon atoms such as acetone, methyl ethyl ketone, methyl isobutyl ketone, methyl isoamyl ketone and diacetone alcohol, with acetone and methyl ethyl ketone being preferred; and from liquid aromatic hydrocarbons such as benzene, toluene and xylene, with benzene and toluene being preferred.

It is preferred that the organic solvent vapor has a specific gravity greater than air and is a chlorosubstituted hydrocarbon. It is further preferred that the solvent be characterized by being typically inert to isocyanates.

If desired, various materials can be mixed with the volatile organic solvents to form a solution for the purpose of depositing on or reacting with the textile fabric. It is generally preferred that they be reactive with the fabric and that they be characterized by having a boiling point at least about 5° C., and preferably at least about 20° C., above the boiling point of said solvent. Representative examples of such materials are polyisocyanates having an isocyanato functionality of 2 to 3 such as:

Polymethylene polyphenylisocyanate (PAPI)
Triphenyl methane-triisocyanate (TMTI)
2,4-tolylene-diisocyanate (2,4-TDI)
2,6-tolylene-diisocyanate (2,6-TDI)
Bitolylene diisocyanate (TODI)
Dianisidine diisocyanate (DADI)
Hexamethylene diisocyanate (HDI)
m-Phenylene diisocyanate (PDI)

1-alkyl-benzene-2,4-diisocyanate (AB-2,4-DI)
1-alkyl-benzene-2,5-diisocyanate (AB-2,5-DI)
2,6-dialkyl-benzene-1,4-diisocyanate (DBDI)
1-chlorobenzene-2,4-diisocyanate (CDI)
Dicyclohexylmethane-diisocyanate (CXDI)
3,3-dimethoxy diphenyl methane-4,4'-diisocyanate (DDMDI)
1-nitrobenzene-2,4-diisocyanate (NDI)
1-alkoxy-benzene-2,4-diisocyanate (ABDI)
1-alkylbenzene-2,6-diisocyanate (ADI)
m-Xylylene-diisocyanate (XDI)
1,3-dimethyl-4,6-bis($\beta$-isocyanatoethyl)-benzene-diisocyanate (DBIBDI)
Hexahydrobenzidine-4,4'-diisocyanate (HBDI)
Ethylene-diisocyanate (EDI)
Propylene-1,3-diisocyanate (PDI)
Cyclohexylene-1,2-diisocyanate (CDI)
3,3'-dichloro-4,4'-biphenylene diisocyanate (DBDI)
2,3-dimethyl-tetramethylene diisocyanate (DTDI)
p,p'-Diphenylene diisocyanate (DPDI)
2-chlorotrimethylene diisocyanate (CTDI)
Butane-1,2,2-triisocyanate (BTI)
Trimethylene diisocyanate (TMDI)
Tetramethylene diisocyanate (TDI)
Propylene-1,2-diisocyanate (PDI)
Butylene-1,2-diisocyanate (BDI)
Ethylidene diisocyanate (EDI)
Metaphenylene diisocyanate (MPDI)
Diphenylmethane 4,4'-diisocyanate (DP-4,4-DI)
Diphenyl 4,4'-diisocyanate (DPDI)
1,5-Diisocyanate naphthalene (1,5-DIN)
2,4-Diisocyanate chlorbenzene (2,4-DICB)
4,4',4''-Triisocyanate triphenyl methane (4,4',4''-TITM)
Polymethylene diisocyanate (PMDI)

It is typically required that the solvent solution contain about 0.1 to about 1 weight percent of the polyisocyanate, and/or other fabric reactive materials, and preferably about 0.2 to about 0.5 percent based on the solvent. The polymethylene polyphenylisocyanate, having an average isocyanato content of about 2.3 to about 3, is a preferred polyisocyanate.

Further objects and advantages of this invention can be more readily observed by reference to the drawing showing a diagramatic view of a fabric treating apparatus comprising, in sequence, a pretreat stage and substantially enclosed dip and drying and recovery stages.

With reference to the drawing, a textile fabric 1 having a width of about 60 inches and a weight of about 12.5 ounces per square yard is continuously fed from a roll 2 at about 30 feet per second through a drying stage 3 under a tension of about 1.5 pounds per cord in which it is fed around rotating steam heated cans 4 where it is heated to a temperature in the range of about 90° C. to about 110° C. for about 20 seconds. The farbic, in this stage, is then cooled to about 28° C. to about 55° C. by feeding around rotating cooling cans 5 for about 20 seconds.

The pretreated fabric is fed to an upper portion of a dip stage 6, through a vapor seal down through a liquid chloro-substituted hydrocarbon solution dip 7, such as methyl chloroform, which may contain about 0.5 weight percent of a fabric treating compound such as a polyisocyanate having an isocyanato functionality of about 2.5 to about 3.

The dipped fabric is then fed to a drying stage 8 around heating cans 9 where it is heated to a temperature of about 80° C. to about 150° C. to substantially remove at least about 99 weight percent of the chloro-substituted hydrocarbon solvent from the fabric. The evaporated chloro-substituted hydrocarbon solvent is condensed in the recovery stage by cooling coils 10 into a container 11 and recycled back to the dip stage by the recycle means as a pump 12. The cooling coils 10 also operate to effect a vapor seal for the entrance and exit of the fabric from the drying and recovery stage.

The practice of this invention is further illustrated by reference to the following examples which are intended to be representative rather than restrictive of the scope of the invention. Unless otherwise indicated, all parts and percentages are by weight.

EXAMPLE I

A polyester textile fabric of 1000 denier with 2 yarns and 12 turns per inch, (1000/2; 12/12), containing 30 cord ends per lateral inch (epi) and with a weight of 8.18 ounces per linear yard was continuously fed from a roll at a rate of 20 linear yards per minute under a tension of 0.4 pounds per cord to a pretreat stage.

In the pretreat stage, the fabric was sequentially fed around two 23-inch diameter tubular rotating hot cans, each with about 300° of contact, in a manner illustrated in the accompanying drawing. The hot cans were internally heated with 20 pounds per square inch gauge (psig) superheated steam. The fabric had a residence time of 10 seconds in this porton of the pretreat stage and was heated to approximately 80° C. Volatile finishing materials and moisture evaporated from the fabric were vented to the atmosphere. In the second portion of the pretreat stage, the fabric was cooled for about 10 seconds to about 55° C. by passing around two 23-inch diameter rotating cold cans, each with about 300° of contact, which were cooled with water at a temperature of 20° C.

The fabric was immediately passed through a cold vapor seal to a dip stage which was isolated from the atmosphere under a tension of about 0.4 pounds per cord. Therein, it was dipped for about 0.1 seconds in a dip solution at a temperature of about 28° C. The dip solution was a 0.4 weight percent solution of polymethylene polyphenyl isocyanate having an isocyanato content of about 2.5 to about 2.8 in methyl chloroform. The polyisocyanate was of the type prepared by phosgenating an aldehydeamine product and obtainable under the trademark "PAPI" from the Upjohn Company.

The dipped and wetted fabric was fed directly, without atmospheric contact, through a cold vapor seal into the upper portion of an enclosed drying stage isolated from the atmosphere. In the drying stage, the fabric was passed around two 23-inch diameter rotating hot cans, each with about 300° of contact, under a tension of about 0.4 pounds per cord for 12 seconds. The hot cans were internally heated with 100 psig steam to heat the fabric to about 95° C. The fabric was then passed out the top portion of the drying stage through a cold vapor seal for further treatment such as coating with various materials.

Cooling coils, water cooled to about 16° C., were positioned inside the drying stage both to prevent heavy methyl chloroform vapors from escaping through the vapor seals and to condense the methyl chloroform. The condensed methyl chloroform was collected at the bottom of the drying stage and passed through a heat exchanger, where it was cooled to about 32° C., to a tank where most of any water contained therein separated to form a top layer. The liquid methyl chloroform was filtered through a diatomaceous earth filter, obtainable as Model 33 with a 33-inch diameter cartridge from the Sparkle Company, to remove any residual fines or solids which may be present. The solvent was subsequently passed through an ion exhange dehydrating bed to remove any residual moisture onto a bulk storage tank and then recycled to the dip stage. Additional polyisocyanate was added to the dip stage as needed.

It is important to note that although the pretreat stage of this invention does not remove all moisture or harmful finishing materials from the textile fabric, it does remove most of such materials and without such a pretreatment, the drying and filtering treatment of the condensed methyl chloroform from the drying stage would be insufficient to effect an economical process.

EXAMPLE II

Two textile fabrics of the type used in Example I were treated according to the method of Example I and herein identified as fabrics A and B, except that fabric B was not pretreated in the pretreat stage.

After the drying step of Example I, each fabric was fed to a second dip stage where it was coated with a blocked isocyanate adhesive, identified herein as an R/F/L/BNCO adhesive, and then dried. The R/F/L/BNCO adhesive dip was an aqueous solution of an isocyanate blocked resorcinol/formaldehyde/latex composition. About 6 weight percent of the adhesive composition was deposited on the fabric and the coated fabric dried at about 230° C. for about 2 to 3 minutes.

The adhesive coated fabrics were then embedded in a rubber stock compounded according to Table 1.

Table 1

| Ingredients | Parts |
| --- | --- |
| Natural rubber | 100 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

The resulting rubber embedded fabric was tested for peel adhesion, stiffness and fatigue with fabric B being a control and assigned arbitrary values of 100. The comparative values are shown in Table 2.

Table 2

| Test | Fabric A | Fabric B |
| --- | --- | --- |
| Peel adhesion | 117 | 100 |
| Stiffness | 68 | 100 |
| Fatigue | 162 | 100 |

Peel adhesion is determined in the following manner. Onto the surface of a 12 mil thick sheet (12 inch × 12 inch) of rubber (MRS) is laid the treated cords which are then covered with a second sheet (12 inch × 12 inch) of 12 mil gauge rubber (MRS). This "sandwich" arrangement of rubber cord and rubber is then doubled onto itself with a piece of Holland cloth extending one inch into the doubled assembly from the open end from which assembly is clicked 1 inch × 3 inch samples, which samples are then cured in a mold at 290° F. for 20 minutes. The cured sample is then placed in an Instron machine, heated at 250° F. and the two strips of rubber separated by the Holland cloth are then moved in opposite directions at the rate of 2 inch per minute to determine the average force.

The fatigue test is made by forming a tube of the cord embedded rubber and tested in accordance with the "Mallory" tube fatigue test described in ASTM D-885-59T, Section 42, and also as described in U.S. Pat. No. 2,412,524.

The R/F/L/BNCO adhesive solution is prepared by mixing and aging an RFL composition and an isocyanate blocked resin (BNCO).

The isocyanate blocked resin is prepared by first forming an R/F identified herein as Resin A and then blocking with a polyisocyanate of the type hereinbefore described for the first fabric dip.

The Resin A is formed by mixing 110 parts of resorcinol, 25 parts by volume of fomalin (37% formaldehyde in methanol and water), and 20 parts by volume of water. The mixture is reacted in a vessel equipped with both heating and cooling coils, a reflux condenser and a suitable agitator. The mixture is heated to reflux temperatue (100° C.) and allowed to remain at this temperature for 15 minutes, after which an additional 30 parts by volume of formalin was added over a period of 10 minutes. After being refluxed for an additonal 30 minutes, the resin formed in the reaction vessel was allowed to cool to room temperature. A thick, syrupy resin (for convenience referred to as Resin A) containing 60 percent solids, a viscosity of 750 cps. and pH of 7 was obtained.

Twenty parts of the Resin A is then reacted with 6 parts of polymethylene polyphenylisocyanate (PAPI) for 48 hours at about 22° C. At the end of this time, the resulting reaction mixture is treated with 0.1 parts of sodium hydroxide and 100 parts of water. The resulting neutralized resin-blocked polyisocyanate (BNCO) may be used as such or may be allowed to age for 8 hours before being used.

The R/F/L portion of the adhesive is made in accordance with the following formula:

| R/F/L Adhesive | |
| --- | --- |
| Ingredients | Parts |
| Resorcinol | 98 |
| Formaldehyde (37%) | 53 |
| Terpolymer rubber latex of styrene/butadiene-1,3/vinylpyridine 15/70/15 (41%) | 1152 |
| Water | 543 |

This R/F/L adhesive is prepared by adding 98 parts of the resorcinol to 196 parts of water, followed by the addition of 53 parts of formaldehyde. The resulting mixture is aged for one hour and then 1152 parts of terpolymer rubber latex is added. The resulting mixture is aged for a period of 24 hours. After aging, the balance of the water is added.

The R/F/L/BNCO dip is then prepared by mixing 65 parts of the R/F/L composition with 35 parts of the resin blocked isocyanate BNCO and allowed to age at about 22° C. for about 4 hours.

EXAMPLE III

A polyester fabric was treated according to the method of Example II, and identified herein as fabric C, except that in the pretreat stage the fabric was heated with forced hot air at a temperature of about 390° F. for about 90 seconds instead of with the internal heating of the hot cans with heated steam. The fabric was then cooled in the pretreat stage to about 28° C. before passing to the dip stage.

The resultant treated fabric after coating with the R/F/F/BNCO adhesive and encased in the rubber deomonstrated substantially improved peel adhesion, fatigue and reduction in stiffness compared to control fabric B as more clearly illustrated in the following Table 3.

Table 3

| Test | Rating Pretreated Fabric C | Rating Un-Pretreated Fabric B |
|---|---|---|
| Peel Adhesion | 112 | 100 |
| Stiffness | 90 | 100 |
| Fatigue | 160 | 100 |

EXAMPLE IV

The recovered solvents from Example II with and without the pretreat step are herein identified as recovered solvents A and B, respectively. As a dramatic measure of the effectiveness of the pretreat step upon the substantially improved quality of the recovered methyl chloroform solvents from the drying and recovery stage, their appearances were noted and water content determined and compared in Table 4. As shown in Table 4, the water content in parts per million was substantially reduced.

Table 4

| Recovered Solvent | Appearance | Water Content |
|---|---|---|
| A (pretreated fabric) | Clear | 807 |
| B (unpretreated fabric) | Cloudy | 1462 |

The water content was determined by Karl Fischer reagent titration. For convenience in the laboratory, the technique of titrating has been standardized as F. D. test No. 12-2 and identified as Aquatest II.

While certain representative embodiments and details have been shown for the purpose of illustrating the invention, it will be apparent to those skilled in this art that various changes and modifications may be made therein without departing from the spirit or scope of the invention.

What is claimed is:

1. A method of inhibiting the tacky contaminate in a process for application of a polyisocyanate to a woven textile tire cord fabric by continuous treatment thereof with an organic solvent containing about 0.1 to about 1 weight percent of said polyisocyanate in which it is desired to recycle said organic solvent; where said fabric is prepared from materials selected from at least one of polyamides, polyesters, cotton and rayon, where said polyisocyanate has an isocyanate functionality in the range of 2 to about 3 and where said organic solvent is a chloro-hydrocarbon selected from dichloroethylene, trichloroethylene, 1,1,2,2-tetrachloroethylene, dichloromethane, 1,2-dichloroethane, trichloroethane, 1,1,1-trichloroethane and 1,1,2-tetrachloroethane; where said method comprises, in cooperative sequential preparation steps which have been allowed to equilibrate for at least 1 hour with the fabric under a tension of about 0.2 to 7 pounds per cord, (A) pretreating said fabric in a pretreat stage over a period of about 5 to about 120 seconds by preheating the fabric to a temperature in the range of about 70° C. to about 200° C. to remove volatile fabric finishing materials and moisture therefrom by evaporation, (B) cooling said fabric to a temperature of about 25° C. to about 55° C. and at least about 5° C. below the boiling point of said volatile organic solvent, (C) immediately dipping and wetting the pretreated fabric in an application stage for about 0.1 to about 1 second in a solution comprising said organic chlorohydrocarbon solvent and said polyisocyanate to deposit a portion of said polyisocyante onto the fabric, (D) drying the fabric in a drying and recovery stage, which is enclosed from the atmosphere, by heating to a temperature in the range of about 80° C. to about 150° C. to evaporate at least about 97 weight percent of said chloro-hydrocarbon solvent and polyisocyanate from the fabric and condensing and recovering the evaporated chlorohydrocarbon solvent followed by recycling the recovered chlorohydrocarbon solvent back to said application stage, where said drying and recovery stage is essentially enclosed from the atmosphere.

2. The method according to claim 1 where said solvent is 1,1,1-trichloroethane.

3. The method according to claim 1 where the said polyisocyanate has an isocyanato functionality in the range of about 2.5 to about 3 and where said chloro-substituted hydrocarbon is selected from dichloroethylene, trichloroethylene, 1,1,2,2-tetrachloroethylene, methyl chloroform, dichloromethane, 1,2-dichloromethane and 1,1,2,2-tetrachloroethane.

4. The method according to claim 1 where the polyisocyanate has a boiling point of at least about 20° C. above the boiling point of said solvent, where a tension in the range of about 0.2 to about 7 pounds per cord is applied to said fabric and where said fabric is a woven textile fabric prepared from materials selected from linear polyamides, linear polyesters, cotton, and rayon.

5. The method according to claim 1 where the fabric is under a tension of about 0.2 to about 7 pounds per cord, and is pretreated in the pretreat stage by first heating to a temperature of about 90° C. to about 150° C. over a period of about 5 to about 120 seconds with evaporated volatiles being removed from said stage and then cooled to a temperature of about 25° C. to about 55° C. and at least 10° C. below the boiling point of said solvent over a period of about 5 to about 120 seconds, followed by immediately dipping and wetting the pretreated fabric in the volatile solvent for about 0.1 to about 1 second in the application stage, then drying the dipped fabric at a temperature of about 80° C. to about 150° C. over a period of about 6 to about 120 seconds to evaporate at least about 97 weight percent of said solvent in the drying stage, followed by recovering by condensing the evaporated solvent and recycling back to said application stage.

6. The method according to claim 5 where the fabric is prepared from a linear polyester, the volatile organic solvent is methyl chloroform and contains from about 0.2 to about 0.5 weight percent of a polymethylene polyphenyl isocyanate having an average isocyanato content of about 2.5 to about 3.

* * * * *